(12) United States Patent
Howell et al.

(10) Patent No.: US 8,084,405 B2
(45) Date of Patent: *Dec. 27, 2011

(54) COMPOSITION COMPRISING PERFLUOROPOLYETHER

(75) Inventors: Jon Lee Howell, Bear, DE (US); Alice Elizabeth Van Der Ende, Nashville, TN (US); Erik William Perez, Middletown, DE (US); Krista Lynn Laugesen, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/908,112

(22) Filed: Oct. 20, 2010

(65) Prior Publication Data

US 2011/0034356 A1    Feb. 10, 2011

Related U.S. Application Data

(63) Continuation of application No. 11/218,259, filed on Sep. 1, 2005, now Pat. No. 7,838,475.

(51) Int. Cl.
*C10M 107/24* (2006.01)
*C10M 107/38* (2006.01)
*C10M 107/54* (2006.01)

(52) U.S. Cl. ............... 508/582; 502/579; 502/580
(58) Field of Classification Search .............. 508/579, 508/580, 582
See application file for complete search history.

(56) References Cited

FOREIGN PATENT DOCUMENTS
EP          227103 B1 * 7/1993

* cited by examiner

*Primary Examiner* — Walter D Griffin
*Assistant Examiner* — Taiwo Oladapo

(57) ABSTRACT

A composition is disclosed which comprises an aryl perfluoropolyether, optionally a halogenated oil, and further optionally a thickening agent. The composition can be used as a lubricant itself or as an additive to an oil or grease lubricant and can withstand temperatures higher than 300° C. without decomposition. The halogenated oil can be a perfluoropolyether, a fluorosilicone, a polytrifluorochloroethylene, or combinations of two or more thereof. The thickening agent can be finely divided silica, boron nitride, clay, soap, poly(tetrafluoroethylene), clay, talc, silica, titanium dioxide, polydimethylsiloxane, polyurea, polyurethane, or combinations of two or more thereof.

13 Claims, No Drawings

COMPOSITION COMPRISING PERFLUOROPOLYETHER

CROSS-REFERENCE TO RELATED APPLICATIONS

This application is a continuation of and claims priority to U.S. application Ser. No. 11/218,259, filed Sep. 1, 2005, now U.S. Pat. No. 7,838,475. The entire contents of both of the referenced applications are hereby incorporated by reference.

FIELD OF THE INVENTION

The invention relates to compositions that can be used as lubricating oils or as lubrication additives in oils or greases. The compositions comprise mono-aryl and/or di-aryl substituted perfluoropolyether functionalized materials.

BACKGROUND OF THE INVENTION

Trademarks and trade names used herein are shown in upper case.

Perfluoropolyether oils with exceptionally high thermal stability are useful for extreme conditions. Greases are made by the addition of thickening agents, for instance, finely divided silica, boron nitride, clay, soaps, or poly(tetrafluoroethylene) to oils. Both oils and greases tend to corrode metals at elevated temperatures, thus anticorrosion additives are included. An example of such an anticorrosion additive is disclosed in U.S. Pat. No. 6,184,187. The stability of this phosphorus-containing anticorrosion additive has an upper temperature limit in service of about 180° C., whereas the perfluoropolyethers are stable at temperatures over 300° C. Though U.S. Pat. No. 6,653,511 discloses perfluoropolyether primary bromides and iodides useful, for example, to prepare lubricants, surfactants, and additives for lubricants and surfactants, development of more thermally stable anticorrosion additives that extend the use at higher temperatures without corrosion occurring is highly desirable.

SUMMARY OF THE INVENTION

The present invention provides a composition which comprises an aryl perfluoropolyether which is a monofunctional aryl perfluoropolyether, a difunctional aryl perfluoropolyether, or combinations thereof. Optionally, the composition may further comprise one or both of a halogenated oil and a thickening agent. The composition may also further comprise an additive. Typical additives are described below. The composition may be used alone as a lubricant, or as a lubricant additive, especially, as an anticorrosion additive to a lubricant.

DETAILED DESCRIPTION OF THE INVENTION

The composition of this invention may be said aryl perfluoropolyether or the composition may comprise added components as described hereinbelow. The monofunctional perfluoropolyether of this invention has the formula of $R_f-(Y)_a-(C_tR_{(u+v)})-(O-C_tR^1_{(u+v)})_b-R$ and the difunctional perfluoropolyether of this invention has the formula of $R_f^1-[(Y)_a-(C_tR_{(u+v)})-(O-C_tR^1_{(u+v)})_b-R]_2$ where $C_tR_{(u+v)}$ is a divalent aryl group;
$O-C_tR^1_{(u+v)}$ is a divalent aryl oxy group;
$R_f$ is a polyether chain having a formula weight ranging from about 400 to about 15,000 and comprises repeat units selected from the group consisting of:
(a) $J-O-(CF(CF_3)CF_2O)_c(CFXO)_dCFZ-$,
(b) $J^1-O-(CF_2CF_2O)_e(CF_2O)_fCFZ^1-$,
(c) $J^2-O-(CF(CF_3)CF_2O)_jCF(CF_3)-$,
(d) $J^3-O-(CQ_2-CF_2CF_2-O)_k-CQ_2-$,
(e) $J^3-O-(CF(CF_3)CF_2O)_g(CF_2CF_2O)_h(CFX-O)_i-CFZ-$,
(f) $J^4-O-(CF_2CF_2O)_{k'}-$, and
(g) combinations of two or more thereof; and
where
the units with formulae $CF_2CF_2O$ and $CF_2O$ are randomly distributed along the chain;
J is a fluoroalkyl group selected from the group consisting of $CF_3$, $C_2F_5$, $C_3F_7$, $CF_2Cl$, $C_2F_4Cl$, $C_3F_6Cl$, and combinations of two or more thereof;
c and d are numbers such that the c/d ratio ranges from about 0.01 to about 0.5;
X is $-F$, $-CF_3$, or combinations thereof;
Z is $-F$, $-Cl$ or $-CF_3$;
$J^1$ is a fluoroallcyl group selected from the group consisting of $-CF_3$, $-C_2F_5$, $-C_3F_7$, $-CF_2Cl$, $-C_2F_4Cl$, and combinations of two or more thereof;
e and f are numbers such that the e/f ratio ranges from about 0.3 to about 5;
$Z^1$ is $-F$ or $-Cl$,
$J^2$ is $-C_2F_5$, $-C_3F_7$, or combinations thereof;
j is an average number such that the formula weight of $R_f$ ranges from about 400 to about 15,000;
$J^3$ is selected from the group consisting of $-CF_3$, $-C_2F_5$, $-C_3F_7$, and combinations of two or more thereof;
k is an average number such that the formula weight of $R_f$ ranges from about 400 to about 15,000;
each Q is independently $-F$, $-Cl$, or $-H$;
g, h and i are numbers such that (g+h) ranges from about 1 to about 50, the i/(g+h) ratio ranges from about 0.1 to about 0.5;
$J^4$ is $-CF_3$, $-C_2F_5$, or combinations thereof;
k' is an average number such that the formula weight of $R_f$ ranges from about 400 to about 15,000;
each R is independently $-H$, a halogen, $-OH$, $-SO_3M$, $NR^3_2$, $-NO_2$, $-R^4OH$, $-R^4SO_3M$, $-R^4NR^3_2$, $-R^4NO_2$, $-R^4CN$, $-C(O)OR^4$, $-C(O)OM$, $-C(O)R^4$, or $-C(O)NR^3_2$, or combinations of two or more thereof; except that when b=0, R cannot be four hydrogen atoms and $-OH$, or $-Br$, or $-NH_2$; or R cannot be solely H or $-NO_2$ or combinations thereof;
each $R^1$ is independently H, $-R^4$, $-OR^4$, a halogen, $-OH$, $-SO_3M$, $-NR^3_2$, $-NO_2$, $-CN$, $-R^4OH$, $-R^4SO_3M$, $-R^4NR^3_2$, $-R^4NO_2$, $-R^4CN$, $-C(O)OR^4$, $-C(O)OM$, $-C(O)R^4$, or $C(O)NR^3_2$, or combinations of two or more thereof;
each $R^3$ is independently H, $C_1$-$C_{10}$ alkyl, or combinations of two or more thereof;
$R^4$ is a $C_1$-$C_{10}$ alkyl;
M is a hydrogen or metal ion (alkali metal, alkaline earth metal, transition metal, or combinations of two or more thereof) such as Li, Na, K, Rb, Cs, Be, Mg, Ca, Sr, Ba, Cu, Co, Zn, Ni, Fe, Ti, Zr, Va; preferably M is not aluminum;
more preferably M is H, Li, Na, K, Ca, or combinations of two or more thereof;
a is 0 or 1;
b is 0-5;

Y is a linking divalent radical —$CH_2OCH_2$—, —$(CH_2)_o$—O—, —$(CF_2)_n$—, —$CF_2O$—, —$CF_2OCF_2$—, —C(O)—, —C(S)—, or combinations of two or more thereof;
  n is about 1-5;
  o is about 2-5;
  t is equal to 6+u;
  u is any combination of 0,2, 4, 6, 8, 10, 12, 14, 16;
  v is independently either 2 or 4;
  $Rf^1$ is a divalent perfluoropolyether chain segment that can have a number average formula weight of about 400 to about 15,000 and can be selected from the group consisting of:
  (i) —$(CF_2CF_2O)_e(CF_2O)_fCF_2$—,
  (ii) —$(C_3F6O)_p(CF_2CF_2O)_q(CFXO)_rCF_2$—,
  (iii) —$(CF_2CF_2O)(C_3F_6O)_wCF(CF_3)$—,
  (iv) —$CF(CF_3)O(C_3F_6O)_w$—$Rf^2$—O—$(C_3F_6O)_wCF(CF_3)$—,
  (v) —$((CQ_2)CF_2CF_2O)_sCF_2CF_2$—,
  and combinations of two or more thereof; and
  where
  the units with formulae $CF_2CF_2O$ and $CF_2O$ can be randomly distributed along the chain;
  e, f, X, and Q are as defined above;
  p, q and r are numbers such that (p+q) ranges from 1 to 50, and the r/(p+q) ratio ranges from 0.1 to 0.05, and the formula weight of $R_f^1$ is from 400 to 15,000;
  each w is independently 2 to 45;
  $Rf^2$ is linear or branched —$C_mF_{2m}$—;
  m is 1-10; and
  s is an average number such that the formula weight of $R_f^1$ ranges from 400 to 15,000.

In the aryl perfluoropolyether of this invention, Y is preferably —$(CF_2)_n$—. Thus, the monofunctional perfluoropolyether preferably has the formula of $R_f$—$(CF_2)_n$—$(C_tR_{(u+v)})$—$(O$—$C_tR^1_{(u+v)})_b$—R and the difunctional perfluoropolyether preferably has the formula $R_f^1$—$[(CF_2)_n$—$(C_tR_{(u+v)})$—$(O$—$C_tR^1_{(u+v)})_b$—R]$_2$, where $R_f$, $R_f^1$, n, t, R, $R^1$, u, v, and b are as defined above.

Examples of aryl perfluoropolyethers useful in the composition of this invention when Y is —$(CF_2)_n$—include, but are not limited to $CF_3(CF_2)_2(OCF(CF_3)CF_2)_yOCF(CF_3)CF_2C_6Br_3H_2$, $CF_3(CF_2)_2(OCF(CF_3)CF_2)_yOCF(CF_3)CF_2C_6F_3H_2$, $CF_3(CF_2)_2(OCF(CF_3)CF_2)_yOCF(CF_3)CF_2C_6H_4Cl$, $CF_3(CF_2)_2(OCF(CF_3)CF_2)_yOCF(CF_3)CF_2C_6H_4N(CH_3)_2$, $CF_3(CF_2)_2(OCF(CF_3)CF_2)_yOCF(CF_3)CF_2C_6H_3[OC(O)CH_3]_2$, $CF_3(CF_2)_2(OCF(CF_3)CF_2)_yOCF(CF_3)CF_2C_6H_4SO_3M$, $CF_3(CF_2)_2(OCF(CF_3)CF_2)_yOCF(CF_3)CF_2C_6H_3(OH)_2$, $CF_3(CF_2)_2(OCF(CF_3)CF_2)_yOCF(CF_3)CF_2C_6H_4OC_6H_5$, $CF_3(CF_2)_2(OCF(CF_3)CF_2)_yOCF(CF_3)CF_2(C_6H_4O)_2C_6H_5$, $CF_3(CF_2)_2(OCF(CF_3)CF_2)_yOCF(CF_3)CF_2C_6H_4OC_6H_4SO_3M$, $CF_3(CF_2)_2(OCF(CF_3))CF_2)_yOCF(CF_3)CF_2OC_6H_4OC_6H_4NO_2$, $CF_3(CF_2)_2(OCF(CF_3)CF_2)_yOCF(CF_3)CF_2C_{10}H_6SO_3M$, or combinations of two or more thereof where y is a number from about 3 to about 100.

Preferred examples of aryl perfluoropolyethers useful in the composition of this invention include, but are not limited to $CF_3(CF_2)_2(OCF(CF_3)CF_2)_yOCF(CF_3)CF_2C_6H_4SO_3M$, $CF_3(CF_2)_2(OCF(CF_3)CF_2)_yOCF(CF_3)CF_2C_6H_3(OH)_2$, $CF_3(CF_2)_2(OCF(CF_3)CF_2)_yOCF(CF_3)CF_2C_6H_4OC_6H_5$, $CF_3(CF_2)_2(OCF(CF_3)CF_2)_yOCF(CF_3)CF_2(C_6H_4O)_2C_6H_5$, $CF_3(CF_2)_2(OCF(CF_3)CF_2)_yOCF(CF_3)CF_2C_6H_4OC_6H_4SO_3M$, $CF_3(CF_2)_2(OCF(CF_3)CF_2)_yOCF(CF_3)CF_2OC_6H_4OC_6H_4NO_2$, $CF_3(CF_2)_2(OCF(CF_3)CF_2)_yOCF(CF_3)CF_2C_{10}H_6SO_3M$, or combinations of two or more thereof where y is as defined above and M is H, Li, Na, K, Ca, or combinations of two or more thereof.

Still, more preferred, examples of aryl perfluoropolyethers useful in the composition of this invention include, but are not limited to: $CF_3(CF_2)_2(OCF(CF_3)CF_2)_yOCF(CF_3)CF_2C_6H_4SO_3M$, $CF_3(CF_2)_2(OCF(CF_3)CF_2)_yOCF(CF_3)CF_2C_6H_4OC_6H_4SO_3M$, $CF_3(CF_2)_2(OCF(CF_3)CF_2)_yOCF(CF_3)CF_2C_{10}H_6SO_3M$, or combinations of two or more thereof where y is as defined above and M is H, Li, Na, K, Ca, or combinations of two or more thereof.

An aryl perfluoropolyether useful in the composition of this invention is $CF_3(CF_2)_2(OCF(CF_3)CF_2)_yOCF(CF_3)CF_2C_6H_4SO_3M$ where y and M are as defined above. Another aryl perfluoropolyether useful in the composition of this invention is $CF_3(CF_2)_2(OCF(CF_3)CF_2)_yOCF(CF_3)CF_2C_6H_4OC_6H_4SO_3M$ where y and M are as defined above. Still another aryl perfluoropolyether useful in the composition of this invention is $CF_3(CF_2)_2(OCF(CF_3)CF_2)_yOCF(CF_3)CF_2C_{10}H_6SO_3M$ where y and M are as defined above.

The aryl perfluoropolyethers useful in the compositions of the invention can be produced by any means known to one skilled in the art such as those disclosed in *Journal of Organic Chemistry* 1997, 62, pages 7128-7136 and in U.S. Pat. No. 4,941,987, the disclosures of these references are incorporated herein by reference.

For example, one process for producing an aryl perfluoropolyether comprises contacting a perfluoropolyether primary halide such as perfluoropolyether iodide, optionally in the presence of a catalytic amount of a catalyst, with an aromatic compound to produce an aryl-substituted perfluoropolyether. An example of perfluoropolyether primary halide is a perfluoropolyether iodide, which is disclosed in U.S. Pat. No. 6,653,511, the disclosure of which is incorporated herein by reference. Alternatively, the product of the reaction of perfluoropolyether primary halide with an aromatic compound can be further reacted to produce additional lubricating oils or additives.

Any compound that can promote the formation of a perfluoroalkyl or perfluoropolyether free radical can be used as catalyst. Cupric acetate, ferric acetate, ferric chloride, potassium hydroxide or combinations of two or more thereof is an example of suitable catalyst. Such catalyst can be present in the range of from about 0.0001 to about 5% of the primary iodide compound by weight. The contacting can also be carried out in the presence of an oxidizing agent such as, for example, hydrogen peroxide, butyl peroxide, ferrous chloride, benzoyl peroxide, potassium permanganate, or combinations of two or more thereof. A solvent can be present to solubilized the mixture and aid in the formation of aryl perfluoropolyether products. Examples of solvents include acetone, acetic acid, formic acid, methanol, a mineral acid, or combinations of two or more thereof.

Any aromatic compound that can under go an aromatic substitution with a perfluoropolyether radical can be used as the aromatic compound. Examples of aromatic compounds include benzene, toluene, aniline, anisole, diacetoxybenezene, phenyl acetate, dimethoxybenzene, cresol, nitrophenol, diphenyl ether, phenol, diphenoxy benzene, or combinations of two or more thereof.

The aryl perfluoropolyether can be, if desired, neutralized, sulfonated, nitrated or halogenated, for example, with an alkali metal hydroxide, alkali metal oxide, alkali metal salt, alkaline earth metal hydroxide, alkaline earth metal oxide, alkaline earth metal salt, sulfur trioxide, or halide. Specific preparations are provided in the Examples.

The reaction to prepare the aryl perfluoropolyether can be carried out at a temperature from about 30° C. to about 250° C. in a reaction vessel that can contain the autogenous pressure sufficient to complete the reaction as determined by analysis, such as, for instance, up to about 60 hours. The products can be recovered or purified by any means known to one skilled in the art such as distillation, washing with a solvent such as water or acetone or both, filtration, or distillation following washing to remove traces of water or solvent.

The composition of this invention comprising an aryl perfluoropolyether can be used as a lubricant alone or as a lubricant additive. When used as an additive, the composition may be mixed with an oil or grease, such as a halogenated oil, or a grease to produce an oil or grease mixture, in an amount sufficient to provide a concentration of from 0.01 to 99%, or from about 0.1 to about 95%, or from 1 to 25% by weight, of the aryl perfluoropolyether in the mixture. The composition comprising the aryl perfluoropolyether disclosed herein can be readily mixed using any and any method providing adequate stirring suffices for preparing the mixtures. The oil or grease can be any oil or grease known to one skilled in the art, for example, any perfluoropolyethers or perfluoroalkyl ethers produced by E. I. du Pont de Nemours and Company, Wilmington, Del., USA (DuPont); by Ausimont, S.p.A., Milan, Italy; and by Daikin Industries, Ltd., Japan can be used.

The term "halogenated oil" used herein referred to a perfluoropolyether, a fluorosilicone, a polytrifluorochloroethylene, or combinations of two or more thereof.

A common characteristic of perfluoropolyethers is the presence of perfluoroalkyl ether moieties. Perfluoropolyether is synonymous to perfluoropolyalkylether. Other synonymous terms frequently used include "PFPE", "PFPE oil", "PFPE fluid", and "PFPAE".

For example, KRYTOX available from DuPont is a perfluoropolyether having the formula of $CF_3-(CF_2)_2-O-[CF(CF_3)-CF_2-O]_{j'}-R'_f$. In the formula, j' is 2-100, inclusive and $R'_f$ is $CF_2CF_3$, a $C_3$ to $C_6$ perfluoroalkyl group, or combinations thereof.

FOMBLIN and GALDEN fluids, available from Ausimont, Milan, Italy and produced by perfluoroolefin photooxidation, can also be used. FOMBLIN-Y can have the formula of $CF_3O(CF_2CF(CF_3)-O-)_{m'}(CF_2-O-)_{n'}-R^1_f$. Also suitable is $CF_3O[CF_2CF(CF_3)O]_{m'}(CF_2CF_2O)_{o'}(CF_2O)_{n'}-R^1_f$. In the formulae $R^1_f$ is $CF_3$, $C_2F_5$, $C_3F_7$, or combinations of two or more thereof; (m'+n') is 8-45, inclusive; and m/n is 20-1000, inclusive; o' is >1; (m'+n'+o') is 8-45, inclusive; m'/n' is 20-1000, inclusive.

FOMBLIN-Z can have the formula of $CF_3O(CF_2CF_2-O-)_{p'}(CF_2-O)_{q'}CF_3$ where (p'+q') is 40-180 and p'/q' is 0.5-2, inclusive.

DEMNUM fluids, available from Daikin Industries, Japan, can also be used. It can be produced by sequential oligomerization and fluorination of 2,2,3,3-tetrafluorooxetane, yielding the formula of $F-[(CF_2)_3-O]_{t'}R^2_f$ where $R^2_f$ is $CF_3$, $C_2F_5$, or combinations thereof and t' is 2-200, inclusive.

Perfluoropolyethers comprising branched or straight chain perfluoroalkyl radical end groups, each of which having 3 or more carbon atoms per end group can also be used. Examples of such perfluoropolyethers can have the formula of $C_{r'}F_{(2r'+1)}-A-C_{r'}F_{(2r'+1)}$ in which each r' is independently 3 to 6; A can be $O-(CF(CF_3)CF_2-O)_{w'}$, $O-(CF_2-O)_{x'}$, $(CF_2CF_2-O)_{y'}$, $O-(C_2F_4-O)_{w'}$, $O-(C_2F_4-O)_{x'}(C_3F_6-O)_{y'}$, $O-(CF(CF_3)CF_2-O)_{x'}(CF_2-O)_{y'}$, $O-(CF_2CF_2CF_2-O)_{w'}$, $O-(CF(CF_3)CF_2-O)_{x'}(CF_2CF_2-O)_{y'}-(CF_2-O)_{z'}$, or combinations of two or more thereof; preferably A is $O-(CF(CF_3)CF_2-O)_{w'}$, $O-(C_2F_4-O)_{w'}$, $O-(C_2F_4-O)_{x'}(C_3F_6-O)_{y'}$, $O-(CF_2CF_2CF_2-O)_{w'}$, or combinations of two or more thereof; w' is 4 to 100; x' and y' are each independently 1 to 100. Specific examples include, but are not limited to, $F(CF(CF_3)-CF_2-O)_9-CF_2CF_3$, $F(CF(CF_3)-CF_2-O)_9-CF(CF_3)_2$, and combinations thereof. In such PFPEs, up to 30% of the halogen atoms can be halogens other than fluorine, such as, for example, chlorine atoms.

Fluorosilicones suitable for use in the invention can be any fluorocarbon containing silicone fluid. The preferred fluorosilicone is a fluorosilane, a fluorosiloxane, or combinations thereof. A suitable fluorosilicone can have the formula of $R'_f-(CH_2)_{n''}-Si-R^2_3$ in which $R'_f$ can be the same as disclosed above, n" can be 1 to 100, and each $R^2$ can be independently an alkyl group, an alkoxy group, a thioalkyl group, an amino group, an aryl group, or combinations of two or more thereof. An example of suitable fluorosilicone is DOW CORNING FS-1265 fluorosilicone oil from Dow Coming, Midland, Mich.

Polytrifluorochloroethylenes suitable for use in the invention can have the formula of $(-CCl_2CFCl-)_{s'}$ where s' is 2-100, inclusive. Example of suitable polytrifluorochloroethylenes are HALOCARBON oils from Halocarbon, Riveredge, N.J. The preferred polytrifluorochloroethylene is HALOCARBON 200.

The composition of this invention can also comprise a thickening agent to produce a grease. Thickening agents include, but are not limited to, polytetrafluoroethylene, talc, silica, clay, boron nitride, metal soaps, titanium dioxide, polydimethylsiloxane, polyurea, polyurethane or combinations of two or more thereof. Minor amounts of other additive such as perfluoroalkyl surfactants or polyoxyperfluoroalkyl surfactants, or other additives known in the art (stabilizers, anticorrosive agents, anti-wear agents) may also be present in the composition of this invention. The thickening agent and/or additive can be present in the composition from about 0.01 to about 60%, or about 0.1 to about 20% by weight.

The upper limit can be determined by the National Lubricating Grease Institute (NLGI) grade specification requirement. Greases are graded according to NLGI from 000 to 6 as measured by penetration (mm). Formulations for greases based on halogenated oils are well known to one skilled in the art. For example, the aryl perfluoropolyether of this invention can be present in the grease in an amount of from about 0.01 to about 90%, or about 0.1 to about 10%, by total weight of the grease composition.

An oil or grease comprising a composition of this invention can be produced by any means known to one skilled in the art such as, for example, mixing the components, that is, mixing a composition of this invention with an oil or grease or mixing a composition of this invention with an oil and a thickening agent, together. Since the means are well known, the discussion is omitted herein in the interest of brevity.

The following methods and examples illustrate the invention.

Test Methods and Materials

Test Method 1. Heat treatment of mixtures of perfluoropolyether and aryl perfluoropolyether compositions.

Two parts by weight of the perfluoropolyether derivative prepared according to the Examples were thoroughly mixed with 98 parts of KRYTOX GPL107-500 (a perfluoropolyether oil available from E. I. du Pont de Nemours and Company). An aliquot was placed in a preheated oven at 200° C. for 24 hours. The sample was removed, allowed to cool, and subjected to the pin corrosion test (Test Method 2). In each Example below, the composition was subjected to this heat treatment prior to evaluation using the pin corrosion test.

Test Method 2. Pin corrosion (antirust) test

The pin corrosion test (antirust test), fully detailed in U.S. Pat. No. 6,184,187, incorporated herein by reference, was used. In summary, anti-rust properties of oil additives were tested using a variation of ASTM D-665, otherwise known as the "pin test". The test used a C1018 centerless ground cylindrical coupon [¼ inch diameter×2-½ inch length (0.64 cm×6.4 cm), 1/16 inch slot (0.16 mm), P/N#2200 from Metal Samples Co., Munford Ala.). The coupon was cleaned and stored in toluene and thoroughly air dried (for 10 minutes) prior to use. The coupon was placed in the test fluid for 1 minute and excess fluid was allowed to drip off for 1 hour. It was then immersed in a beaker of medium hard water, which was held at 80° C. for 24 hours with the use of a TEFLON-coated thermocouple and temperature controller. (The preparation of medium hard water is provided in U.S. Pat. No. 6,184,187). After the 24-hour period, the pin was removed from the water, wiped gently to remove loose rust and evaluated. Evaluation was based on the following:

Excellent: No rust or light rust in a 24-hour period;
Good: Moderate rust occurring in a 24-hour period;
Fair: Severe rust occurring in a 24-hour period, but not covering more than 35% of the surface.
Poor: Rust covering more than 35% of the surface.

Samples with the rating "fair" or better are considered acceptable.

Test Method 3. Wear test

Wear testing was conducted according to the America Society for Testing and materials (ASTM) Test D3233-93 (re-approved 1998), Standard Test Methods for Measurement of Extreme Pressure Properties of Fluid Lubricants (Falex Pin and Vee Block Methods).

CELITE 521 is a diatomaceous earth filter aid available from Aldrich Chemical, Milwaukee, Wis.

HFE-7100 is perfluorobutyl methyl ether available from 3M Company, Minneapolis, Minn.

KRYTOX (perfluoroalkylether; GPL (General Purpose Lubricants) 107-500 is a grade of KRYTOX) is available from DuPont.

KRYTOX Iodide [$CF_3(CF_2)_2(OCF(CF_3)CF_2)_zOCF(CF_3)CF_2I$ where z is about 8] is available from DuPont. It is produced by the methods described in U.S. Pat. No. 6,653,511, incorporated herein by reference.

ACRODISC syringe filters with PTFE membrane, 0.45 μm, are available from VWR (West Chester, Pa.).

EXAMPLES

Gas chromatography/mass spectroscopy (GC/MS) was used to determine reaction completion and product characterization. Distillation under vacuum was conducted under 1 mm Hg (0.13 kPa).

Example 1

Preparation of KRYTOX Benzene—$CF_3(CF_2)_2(OCF(CF_3)CF_2)_zOCF(CF_3)CF_2C_6H_5$ KRYTOX Iodide (200 g; MW 1345) was placed in a 500-mL 4-neck round-bottom flask equipped with a mechanical stirrer, thermocouple and a reflux condenser. Glacial acetic acid (85 mL), 0.5 g of copper(II) acetate, and 55 g of benzene were added. The mixture was heated to 100° C. Benzoyl peroxide (160 g) was added in three increments over one and a half days. When analysis indicated all the iodide was reacted, the oil was washed sequentially with water and acetone (100 mL each) and then distilled under vacuum at 100° C. The resulting sample was then filtered in a Buchner funnel through a 0.25 inch (6.4 mm) layer of CELITE 521 supported on a WHATMAN filter paper. Product (175 g) was retained.

Example 2

Preparation of KRYTOX Benzene Sulfonic Acid—
$CF_2C_6H_4SO_3H$

KRYTOX Benzene (100 g), prepared as in Example 1, was added to a 250-mL, 4-neck round bottom flask equipped as in Example 1. Oleum (20%; 28 g) was dispensed into a dropping funnel and slowly dripped into the flask over a 15 minute period. The flask contents were heated to 100° C. and stirred overnight. The flask was cooled to less than 30° C., and, while cooling, water (about 100 mL) was slowly added, maintaining the temperature at less than 30° C. This was followed by addition of HFE-7100 (about 50 mL) and acetone (50 mL) to separate the oil. The oil was washed three times with premixed acetone and water solution (100 mL each) and distilled at 100° C. under vacuum. Product (82 g) was retained.

Example 3

Preparation of KRYTOX Diacetoxybenzene—$CF_3(CF_2)_2(OCF(CF_3)CF_2)_zOCF(CF_3)CF_2C_6H_3(OC(O)CH_3)_2$ KRYTOX Iodide (526 g) and 108.2 g of diacetoxybenzene were added to a 1-L round bottom flask. Glacial acetic acid (500 mL) and 0.5 g of copper(II) acetate were then added to flask. The reactants were heated to 90° C. and benzoyl peroxide (75 g) was added in 5-g aliquots over a 3-day period until the iodide had all reacted. The reaction product was cooled to room temperature. The mixture was washed twice with 500 mL methanol to remove the non-fluorinated organic products. The solvent was distilled off at 90° C. under vacuum. The resulting sample was then filtered as in Example 1, to produce the product (506.65 g).

Example 4

Preparation of KRYTOX Dihydroxybenzene—$CF_3(CF_2)_2(OCF(CF_3)CF_2)_zOCF(CF_3)CF_2C_6H_3(OH)_2$ KRYTOX diacetoxybenzene, prepared as in Example 3 (525 g) and HFE 7100 (250 mL) were added to a 1-L round bottom flask. Potassium hydroxide (45 g), water (250 mL) and methanol (250 mL) were added to the flask. The reactants were heated to reflux at 60° C. After 4 hours of refluxing, 10% hydrochloric acid (500 g) was added The reaction mixture was stirred until the KRYTOX diacetoxybenzene had reacted. The bottom product layer was separated and washed three times with equal volumes of premixed acetone and water (1:1). The product was distilled to 100° C. under vacuum and then filtered as in Example 1 to produce the product (465.30 g).

Example 5

Preparation of KRYTOX Dimethoxybenzene—$CF_3(CF_2)_2(OCF(CF_3)CF_2)_zCF(CF_3)CF_2C_6H_3(OCH_3)_2$ KRYTOX Iodide (100 g) and dimethoxybenzene (25.6 g) were added to a 1-L round bottom flask equipped with a mechanical stirrer, thermocouple and a condenser. Glacial acetic acid (500 mL) and copper(II) acetate (1.0 g) were then added to flask. The reactants were heated to 90° C. Benzoyl peroxide (75 g) was added in 5 g increments over a period of 6 days, until the iodide had all reacted as determined by analysis. After the reaction was complete, the mixture was washed twice with 250-mL of methanol. Perfluorohexane (50 mL) was added to assist in separations. The product was distilled to 100° C. under vacuum to produce final product (85 g).

Example 6

Preparation of KRYTOX Dihydroxybenzene—$CF_3(CF_2)_2(OCF(CF_3)CF_2)_zOCF(CF_3)CF_2C_6H_3(OH)_2$ Boron tribromide (18 g) was placed in a 250-mL 4-neck round-bottomed flask as described in Example 2. KRYTOX dimethoxybenzene (50 g), prepared as in Example 5 was dripped into the flask over a 15 minute period. The mixture was stirred for 5 hours followed by the addition over 15 minutes, of about 50 g each of water, acetone and perfluorohexane. The oil layer was separated, filtered as in Example 1 and then distilled to 100° C. under vacuum to produce 44 g of product.

Example 7

Preparation of KRYTOX Diphenyl Ether—$CF_3(CF_2)_2(OCF(CF_3)CF_2)_zOCF(CF_3)CF_2C_6H_4OC_6H_5$ KRYTOX Iodide (150 g) was placed in a 500-mL 4-neck round-bottom flask as described in Example 1. Glacial acetic acid (75 mL), copper(II) acetate (0.4 g), and diphenyl ether (85 g) were added. The mixture was heated to 100° C. followed by adding benzoyl peroxide (48 g). After 45 minutes, more benzoyl peroxide (48 g) was added. Completion of the reaction within one day was indicated by consumption of the iodide as determined by analysis. When the reaction was complete, the oil was washed sequentially with water and acetone (50 mL each), then distilled at 100° C. under vacuum, and then filtered as in Example 1 to produce final product (130 g).

Example 8

Preparation of KRYTOX Nitrodiphenyl Ether—$CF_3(CF_2)_2(OCF(CF_3)CF_2)_zOCF(CF_3)CF_2C_6H_4OC_6H_4(NO_2)$ 100 mL HFE-7100 was added to a 4-neck round bottom flask equipped with a mechanical stirrer, thermocouple and a condenser. To the flask, 25 g of tetramethylammonium nitrate and 50 g of trifluoromethanesulfonic anhydride were added to the flask. The mixture was allowed to stir at room temperature for 1.5 hours. After stirring, 89 g of KRYTOX Diphenyl Ether, as prepared in Example 7, was dripped in using an addition funnel. The mixture stirred and heated for 8 hours at 80° C. Once the reaction was done, 100 mL of water was slowly added. The oil was separated with HFE 7100 and acetone. The product was then isolated, washed several times with acetone and water, distilled with an oil pump vacuum at 100° C., and filtered through celite and Whatman #1 filter paper. 79.8 g of product was retained.

Example 9

Preparation of KRYTOX Diphenoxy Benzene—$CF_3(CF_2)_2(OCF(CF_3)CF_2)_zOCF(CF_3)CF_2(C_6H_4O)_2C_6H_5$ KRYTOX Iodide (50 g) was added to a 250-mL, 4-neck round-bottom flask described in Example 2. To the flask, glacial acetic acid (50 mL), copper(II) acetate (0.13 g), and diphenoxy benzene (70 g) were added. The contents were stirred and heated to 90° C. Then, three portions of benzoyl peroxide (17 g each, total 51 g) were added at 45 minute, intervals. The mixture was stirred at 90° C. for two days. Completion of the reaction was confirmed by analysis. The oil was separated with HFE 7100 as described in Example 2. The product layer was then isolated, washed three times with water and acetone (50 mL each), distilled under vacuum at 100° C. and then filtered as described in Example 1 to produce product (35 g).

Example 10

KRYTOX Diphenyl Ether Sulfonic Acid—$CF_3(CF_2)_2(OCF(CF_3)CF_2)_zOCF(CF_3)CF_2OC_6H_4OC_6H_4SO_3H$ KRYTOX diphenyl ether (78 g, prepared as in Example 7) was added to a 250-mL, 4-neck round-bottom flask described in Example 2, followed by dripping into the flask over a 15-minute period 20% oleum (28 g) through a dropping funnel. The flask contents were heated to 100° C. and stirred overnight. With cooling as in Example 2, water (100 mL) was slowly added. HFE-7100 (50 mL) and acetone (50 mL) were added to separate the oil. The oil was then isolated, washed three times with acetone and three times with water (50 mL each washing) and distilled at 100° C. under vacuum to produce viscous product (69.5 g).

Example 11

Preparation of KRYTOX Benzene Sulfonic Acid Ca Salt $(CF_3(CF_2)_2(OCF(CF_3)CF_2)_zOCF(CF_3)CF_2C_6H_4SO_3)_2Ca$ KRYTOX benzene sulfonic acid (50 g, prepared as in Example 3) was placed in a 250-mL round-bottom flask as described in Example 2. Calcium acetate (6 g) dissolved in water (60 mL) and FIFE 7100 (50 mL) were added to the flask. The contents were stirred and refluxed at 60° C. After 24 hours of reflux and stirring, the product was distilled under vacuum at 100° C. to produce viscous product (49 g).

Example 12

Preparation of 2% KRYTOX Benzene Sulfonic Acid Ca Salt in GPL 107-500

GPL 107-500 (98 g) was placed in a 250-mL round-bottom flask as described in Example 2. KRYTOX benzene sulfonic acid (2 g, prepared as in Example 2) and calcium oxide (0.08 g) were added to the flask. The mixture was heated to 200° C. and stirred for 24 hours. The mixture was filtered through a 0.45 μm poly(tetrafluoroethylene) syringe filter to produce oil product (90 g).

Example 13

Preparation of KRYTOX Benzene Sulfonic Acid Li Salt—$CF_3(CF_2)_2(OCF(CF_3)CF_2)_zOCF(CF_3)CF_2C_6H_4SO_3Li$ KRYTOX benzene sulfonic acid (50 g, prepared as in Example 2) was placed in a 250-mL round-bottom flask as described in Example 2. Lithium acetate (3.6 g) and HFE 7100 (50 mL) were added to the flask. The contents were stirred and refluxed at 60° C. for 24 hours followed by distillation under vacuum at 100° C. to produce viscous product (45 g).

Example 14

Preparation of 2% KRYTOX Benzene Sulfonic Acid Li Salt in GPL 107-500

GPL 107-500 (98 g) was placed in a 250-mL round-bottom flask equipped as described in Example 2. KRYTOX benzene sulfonic acid (2 g, prepared as in Example 2) and lithium acetate dihydrate (0.15 g) were added. The mixture was heated to 200° C. and stirred for 24 hours, followed by filtration through WHATMAN #1 filter paper to produce an oil product (90.8 g).

Example 15

Preparation of KRYTOX Benzene Sulfonic Acid Na Salt—$CF_3(CF_2)_2(OCF(CF_3)CF_2)_zOCF(CF_3)CF_2C_6H_4SO_3Na$ KRYTOX benzene sulfonic acid (50 g, prepared as in Example 2) was placed in a 250-mL round-bottom flask as described in Example 2. Sodium acetate (2.9 g) and HFE 7100 (50 mL) were added and the contents were stirred and refluxed at 60° C. for 48 hours. The product was filtered as described in Example 12 (syringe filter) and then distilled under vacuum to 100° C. to produce final product (36 g).

Example 16

Preparation of 2% KRYTOX Benzene Sulfonic Acid Na Salt in GPL 107-500

GPL 107-500 (98 g) was placed in a 250-mL round-bottom flask as described for Example 2. KRYTOX benzene sulfonic acid (2 g, prepared as in Example 2) and sodium acetate (0.2 g) were added. The mixture was heated to 200° C. and stirred for 24 hours, followed by filtration through WHATMAN #1 paper to produce an oil product (91.6 g).

Example 17

Preparation of 2% KRYTOX benzene sulfonic acid Ni Salt in GPL 107-500

GPL 107-500 (98 g) was placed in a 250-mL round-bottom flask as described in Example 2. KRYTOX benzene sulfonic acid (2 g, prepared as in Example 2) and nickel acetate tetrahydrate (0.36 g) were added to the flask. The mixture was heated to 200° C. and stirred for 24 hours, followed by filtration as described in Example 12 (syringe filter) to produce an oil product (90.2 g).

Example 18

Preparation of 2% KRYTOX Benzene Sulfonic Acid Fe Salt in GPL 107-500

The process was the same as described in Example 12 except that calcium oxide (0.08 g) was replaced with iron acetate (0.25 g). The reaction was heated for 24 hours at 200° C.; no filtration was needed to produce an oil product (93.5 g).

Comparative Example A

A sample was prepared according to the procedure of Example 3 in U.S. Pat. No. 6,184,187.

Tests Results.

The above-described products were tested, after the heat treatment of Test Method 1, using the Pin Corrosion Test (Test Method 2). Wear tests were conducted according to Test Method 3. The Load to Failure (Pin on V-Block) Test was run according to ASTM D-3233. The results are shown in Table 1 below. The conditions for wear test: 5% compound in KRYTOX GPL 106.

TABLE 1

| Compound[a] | Pin Test Result (200° C., 24 hr) | Pin on V-Block Load lb (kg) | Pin on V-Block Torque in-lbf (N-m) |
|---|---|---|---|
| KRYTOX Benzene Sulfonic Acid | Excellent | 3000 (1361) | 71.9 (82.1) |
| KRYTOX Diphenyl Ether | Fair | N/T[b] | N/T |
| KRYTOX Nitrodiphenyl Ether | Excellent | N/T | N/T |
| KRYTOX Diphenyl Ether Sulfonic Acid | Excellent | N/T | N/T |
| KRYTOX Diphenoxy Benzene | Good | N/T | N/T |
| KRYTOX Dihydroxy Benzene | Excellent | 3000 (1316)[c] | 86.6 (97.8)[c] |
| KRYTOX benzene sulfonic acid Ca Salt | Excellent | 3000 (1316) | 63.0 (71.2) |
| KRYTOX benzene sulfonic acid Li Salt | Excellent | N/T | N/T |
| KRYTOX benzene sulfonic acid Na Salt | Excellent | N/T | N/T |
| KRYTOX benzene sulfonic acid Ni Salt | Excellent | N/T | N/T |
| KRYTOX benzene sulfonic acid Fe Salt | Excellent | N/T | N/T |
| Comparative Example A | Poor | N/T | N/T |
| Control (GPL 107)[d] | Poor | N/T | N/T |
| Control (GPL 106)[d] | Poor | 3000 (1361), 3000 (1361)[c] | 87.0 (98.3), 92.7 (104.7)[c] |

[a]Chemical compositions are shown in the individual examples.
[b]N/T = not tested
[c]Second series tested.
[d]KRYTOX perfluoroalkylether.

The results show improved performance of the formulations comprising a composition the invention comprising an aryl perfluoropolyether, as anticorrosion additive, and with performance in the wear test comparable to control tests.

What is claimed is:

1. A composition comprising an aryl perfluoropolyether which is a difunctional aryl perfluoropolyether having the formula of $R_f^1$—[(Y)$_a$—(C$_t$R$_{(u+v)}$)—(O—C$_t$R$^1_{(u+v)}$)$_b$—R]$_2$ wherein $R_f^1$ has a formula weight of about 400 to about 15,000;
   $R_f^1$ is —(CF$_2$CF$_2$O)$_e$(CF$_2$O)$_f$CF$_2$—, —(C$_3$F$_6$O)$_p$ (CF$_2$CF$_2$O)$_q$(CFXO)$_r$CF$_2$—, —(CF$_2$CF$_2$O) (C$_3$F$_6$O)$_w$CF(CF$_3$)—, —CF(CF$_3$)O(C$_3$F$_6$O)$_w$—R$_f^2$—O (C$_3$F$_6$O)$_w$CF(CF$_3$)—, —((CQ$_2$)CF$_2$CF$_2$O)$_s$CF$_2$CF$_2$—, or combinations of two or more thereof;
   where
   the units with formulae CF$_2$CF$_2$O and CF$_2$O are randomly distributed along the chain;
   X is —F, —CF$_3$, or combinations thereof;
   e and f are numbers such that the e/f ratio ranges from about 0.3 to about 5;
   each Q is independently —F, —Cl, or —H;
   p, q and r are numbers such that (p+q) ranges from 1 to 50 and r/(p+q) ranges from 0.1 to 0.05;
   each w is independently 2 to 45;
   $R_f^2$ is linear or branched —C$_m$F$_{2m}$—;
   m is 1-10;
   s is an average number such that the formula weight of $R_f^1$ ranges from 400 to 15,000;
   each R is independently —H, —OH, —SO$_3$M, NR$^3_2$, —NO$_2$, —R$^4$OH, —R$^4$SO$_3$M, —R$^4$NR$^3_2$, —R$^4$NO$_2$, —R$^4$CN, —C(O)OR$^4$, —C(O)OM, —C(O)R$^4$, —C(O)NR$^3_2$, or combinations of two or more thereof; except that when b=0, R cannot be four hydrogen atoms and —OH, or —Br, or —NH$_2$; or R cannot be solely H or —NO$_2$, or combinations thereof;
   each R$^1$ is independently H, —OH, —SO$_3$M, —NR$^3_2$, —NO$_2$, —CN, —R$^4$OH, —R$^4$SO$_3$M, —R$^4$NR$^3_2$, —R$^4$NO$_2$, —R$^4$CN, —C(O)OR$^4$, —C(O)OM, —C(O) R$^4$, —C(O)NR$^3_2$, or combinations of two or more thereof provided that if b=0, the combination of R and R$^1$ cannot be four or more hydrogen atoms and —OH, —NH$_2$, or —NO$_2$;
   each R$^3$ is independently H, C$_1$-C$_{10}$ alkyl, or combinations of two or more thereof;
   R$^4$ is a C$_1$-C$_{10}$ alkyl;
   M is a hydrogen or metal ion wherein the metal ion is selected from the group consisting of alkali metal, alkaline earth metal, transition metal, or combinations of two or more thereof;
   a is 0 or 1;
   b is 0-5;
   Y is a divalent radical —CH$_2$OCH$_2$—, —(CH$_2$)$_o$—O—, —(CF$_2$)$_n$—, —CF$_2$O—, —CF$_2$OCF$_2$—, —C(O)—, —C(S)—, or combinations of two or more thereof;
   n is about 1 to about 5;
   o is about 2 to about 5;
   t is equal to 6+u;
   u is any combination of 0, 2, 4, 6, 8, 10, 12, 14, 16; and
   v is independently either 2 or 4.

2. A composition according to claim 1 wherein M is H, Li, Na, K, Ca, or combinations of two or more thereof.

3. A composition according to claim 1 wherein b is 0 and R is not four hydrogen atoms and —OH, or —NH$_2$; or solely H or —NO$_2$ groups or combinations thereof.

4. A composition according to claim 1 wherein said composition is said aryl perfluoropolyether.

5. A composition according to claim 1 further comprising a halogenated oil which is a perfluoropolyether.

6. A composition according to claim 5 wherein said aryl perfluoropolyether is present in said composition from about 0.01 to about 99% by weight.

7. A composition according to claim 1 further comprising a halogenated oil and a thickening agent, wherein said halogenated oil is a perfluoropolyether, a fluorosilicone, a polytrifluorochloroethylene, or combinations of two or more thereof; and said thickening agent is polytetrafluoroethylene, talc, silica, clay, boron nitride, metal soaps, titanium dioxide, polydimethylsiloxane, polyurea, polyurethane, or combinations of two or more thereof.

8. A composition according to claim 7 further comprising an additive wherein said additive is perfluoroalkyl surfactant, polyoxyperfluoroalkyl surfactant, oil or grease stabilizer, anticorrosive agent, anti-wear agent, or combinations of two or more thereof.

9. A composition according to claim 8 wherein said aryl perfluoropolyether is present in said composition from about 0.1 to about 90% and said thickening agent is present in said composition from about 0.01 to about 60%, both by weight.

10. A grease composition comprising, or produced by combining, a halogenated oil, an aryl perfluoropolyether and a thickening agent, wherein said halogenated oil is a perfluoropolyether, a fluorosilicone, a polytrifluorochloroethylene, or combinations of two or more thereof; said aryl perfluoropolyether is the same as recited in claim 1 and said thickening agent is polytetrafluoroethylene, talc, silica, clay, boron nitride, metal soaps, titanium dioxide, polydimethylsiloxane, polyurea, polyurethane, or combinations of two or more thereof.

11. A grease composition according to claim 10 further-comprising an additive wherein said additive is perfluoroalkyl surfactant, polyoxyperfluoroalkyl surfactant, oil or grease stabilizer, anticorrosive agent, anti-wear agent, or combinations of two or more thereof.

12. A grease composition according to claim 11 wherein said aryl perfluoropolyether is present from about 0.1 to about 90% and said thickening agent is present from about 0.01 to about 50%, both by weight of said grease.

13. A composition comprising, or produced by combining, a perfluoropolyether, an aryl perfluoropolyether and a thickening agent, wherein said aryl perfluoropolyether is the same as recited in claim 1; and said thickening agent is polytetrafluoroethylene, talc, silica, clay, boron nitride, metal soaps, titanium dioxide, polydimethylsiloxane, polyurea, polyurethane, or combinations of two or more thereof.

* * * * *